(No Model.)  2 Sheets—Sheet 1.

W. E. SYMONS & T. SMITH.
METALLIC PACKING.

No. 541,894. Patented July 2, 1895.

Witnesses
Wm Doyle

Inventors
Wilson E. Symons
Thomas Smith
By their Attorneys
C A Snow & Co.

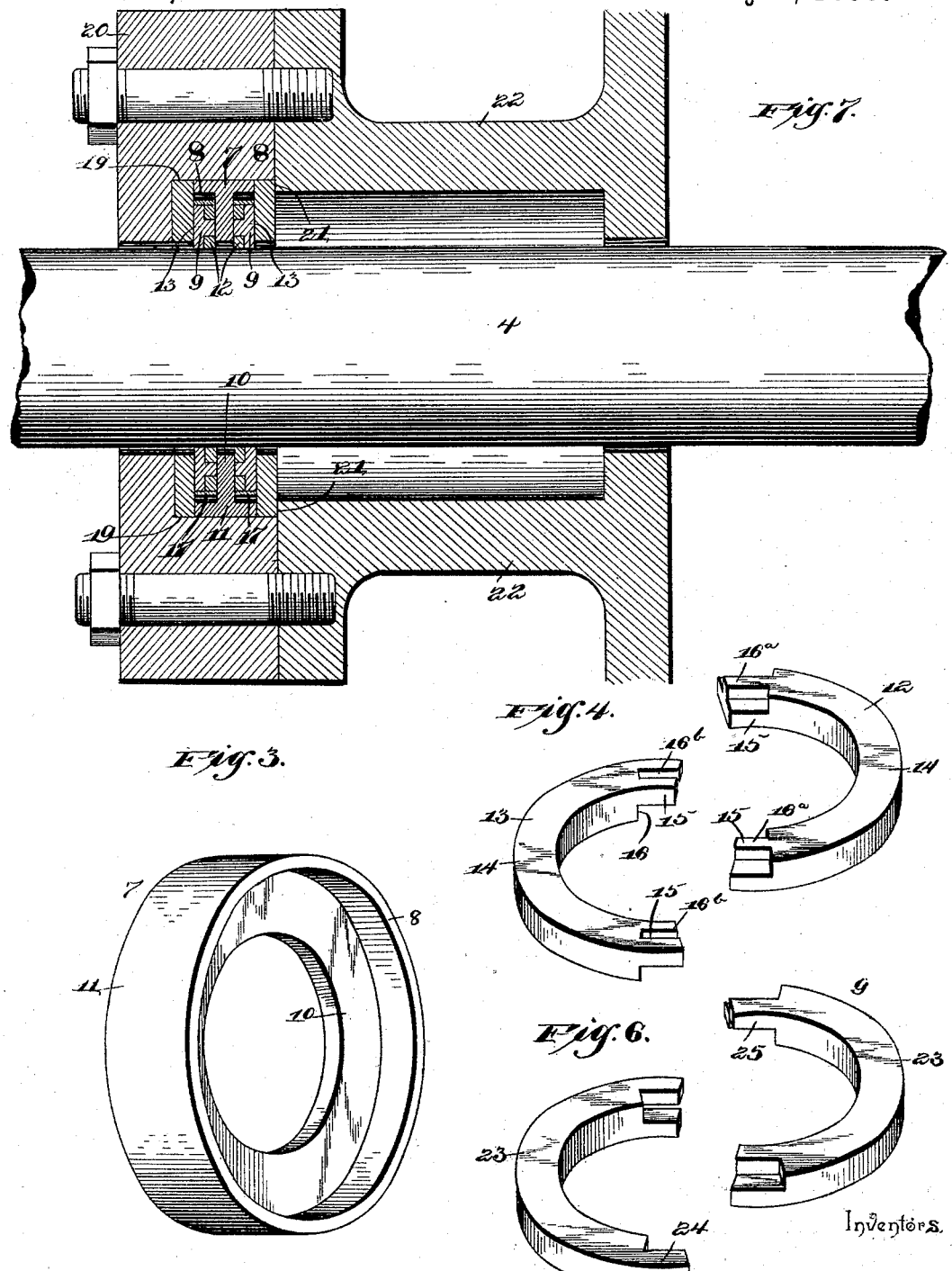

UNITED STATES PATENT OFFICE.

WILSON E. SYMONS AND THOMAS SMITH, OF RATON, TERRITORY OF NEW MEXICO.

METALLIC PACKING.

SPECIFICATION forming part of Letters Patent No. 541,894, dated July 2, 1895.

Application filed October 6, 1894. Serial No. 525,149. (No model.)

*To all whom it may concern:*

Be it known that we, WILSON E. SYMONS and THOMAS SMITH, citizens of the United States, residing at Raton, in the county of Colfax and Territory of New Mexico, have invented a new and useful Metallic Packing, of which the following is a specification.

Our invention relates to self-adjusting metallic packing for piston-rods, valve-stems, and the like; and it has for its object to provide a construction of packing which may be used in connection with the ordinary packing boxes adapted for fibrous and other packing without material change of construction in said boxes, said improved packing being simple, inexpensive and efficient in construction and the pressure upon the piston-rod or valve-stem being regulated so as to insure a steam-tight joint without producing unnecessary frictional contact between the co-acting parts.

Further objects and advantages of the invention will appear in the following description, and the novel features thereof will be particularly pointed out in the appended claims.

Figure 1:
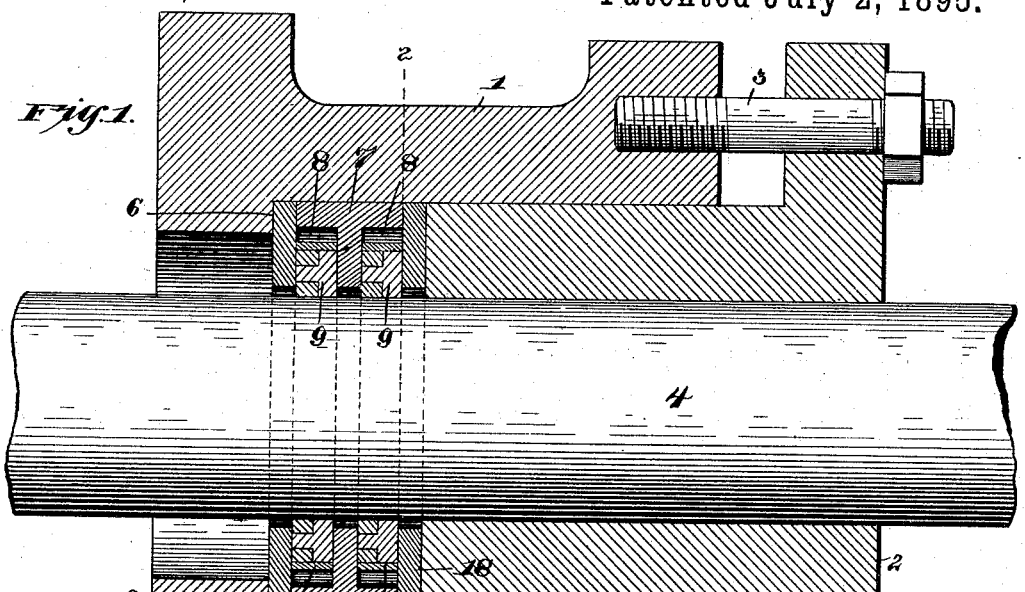
Figure 2:
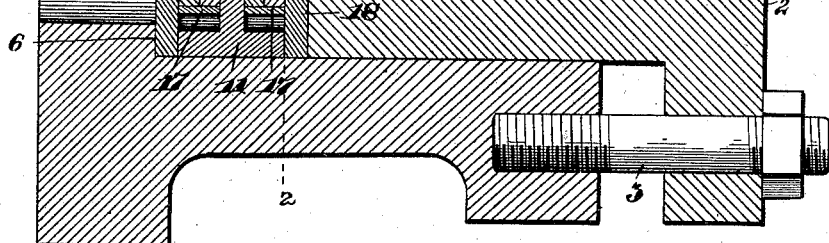
Figure 2:
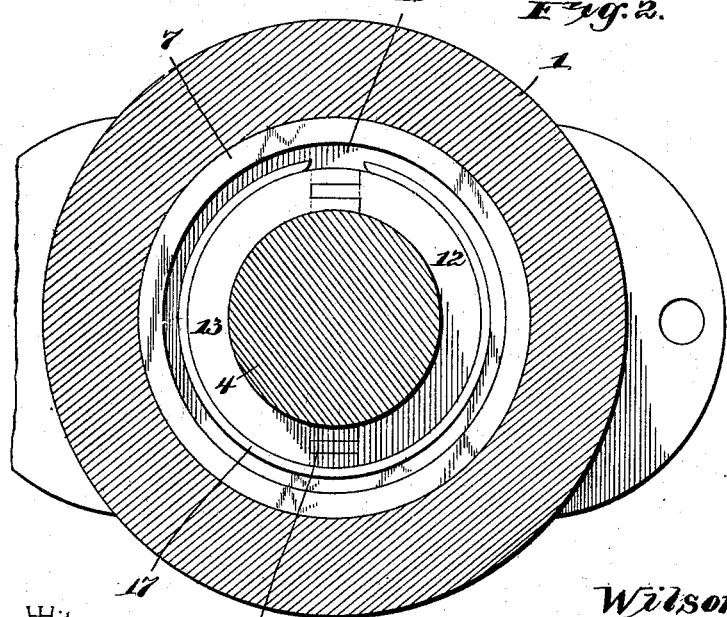
Figure 3:
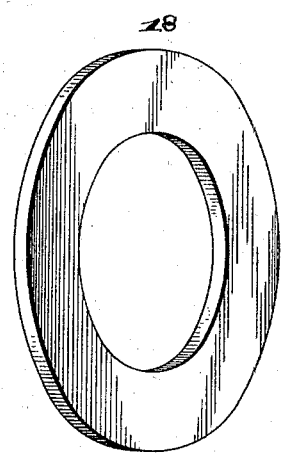

In the drawings, Figure 1 is a longitudinal section of a packing embodying our invention arranged in the operative position in a stuffing-box of the ordinary construction. Fig. 2 is a sectional view on the line 2—2 of Fig. 1, showing one of the adjustable packing-rings in elevation. Fig. 3 is a detail view in perspective of the annular channeled packing frame. Fig. 4 is a detail in perspective of one of the adjustable packing-rings. Fig. 5 is a similar view of one of the annular covering plates. Fig. 6 is a similar view of a slightly modified form of packing-ring. Fig. 7 is a longitudinal section of an ordinary form of gland packing-box with the improved packing arranged in the operative position therein.

Similar numerals of reference indicate corresponding parts in all the figures of the drawings.

Referring to Figs. 1 to 6 inclusive, 1 designates the cylindrical or body portion of a stuffing-box, and 2 the adjustable bushing which fits therein and is secured at the desired adjustment by means of the bolts 3.

4 represents a valve-stem, and the improved packing is arranged between the shoulder 6 in the bore of the cylindrical or body-portion of the stuffing-box and the inner end of the bushing 2. This packing comprises an annular frame 7 provided upon opposite sides of its center with channels 8 in which fit the adjustable packing-rings 9. These channels being arranged upon opposite sides of the center of the annular frame 7 leave a thin annular web 10, which is disposed perpendicular to the outer annular shell 11 of the frame, said shell bearing at its outer surface against the wall of the stuffing-box, and the inner edge of said web being located adjacent to the surface of the stem 4. The said packing-rings are equal in width to the depth of the channels 8, so that their outer sides are flush with the lateral edges of the shell 11, and the construction of said packing-rings is such as to form opposite similar relatively adjustable sections or members 12 and 13. Each section or member comprises a segmental or arc-shaped portion 14 provided with terminal extensions 15 which are interlocked and slidably connected.

In the construction shown in Figs. 1 and 4, the extensions of the members are formed by halving the ends thereof, thus forming shoulders 16, and the extensions of one of the members are provided with perpendicular longitudinally disposed ribs $16^a$ to fit in corresponding slots $16^b$ in the extensions of the other member. Around this ring is arranged a segmental rod or band-spring 17, the tension of which holds the sections or members of the ring pressed inward or toward the stem or piston-rod with their inner edges in easy uniform contact with the surface of such stem or piston-rod.

The packing-rings are slightly less in depth than the web 10, and therefore when the inner edges of the rings bear against the surface of the stem or piston-rod there are similar intervals between their outer edges and the adjacent surfaces of the shell 11, and these intervals are covered by the annular plates 18, the outer surfaces of which bear against the shoulders 6 and the inner end of the bushing 2, and thus break the joints and form with the opposite sides of the web 10 parallel sided ways, in which the adjustable packing-rings fit and operate.

When the improved packing is applied to an ordinary gland stuffing-box, as shown in Fig. 7, the only change of construction in the stuffing-box necessary for a proper use of the packing is to extend the counterbore 19 of the gland 20 so as to form a shoulder 21, on the cone or box 22 against which the inner side of the improved packing may bear.

The modified form of our packing-ring, which is illustrated in Fig. 6, comprises opposite sections or members 23, provided with terminal interlocking extensions or studs 24 and 25 respectively. Each extremity of each section or member is provided with two of these extensions or studs which are arranged diagonally opposite each other with their inner angles contiguous to each other, whereby when the sections or members are assembled the studs interlock and form a continuous ring, whether the said sections or members are extended or contracted in position.

From the above description it will be seen that the improved packing may be applied to an ordinary stuffing-box or gland without material change of construction in either; that the parts of the packing are arranged compactly in order to occupy substantially the same position as the ordinary fibrous material; that the manner of arranging the packing-rings is such as to provide for the lateral yielding thereof to allow for inaccurate centering of the stem or shaft without relieving the steam-tight bearing of the rings upon such stem or shaft; and that the packing is readily removable and replaceable to provide for repair without serious loss of time.

The two forms of packing rings shown in the drawings are substantially similar in construction, the only essential difference residing in the fact that in the form shown in Fig. 4, the extensions are arranged in planes parallel with the sides of the rings, while in the form shown in Fig. 6, said extensions are formed in planes disposed diagonally to the plane of the ring. This form of packing ring provides for easy relative adjustment of the members with a minimum amount of friction and therefore provides for the use of a light actuating spring. Furthermore inasmuch as the extensions are short the liability of twisting under strain and of injury by fracture or otherwise is slight.

It will be seen that the extensions at the opposite extremities of the sections of the improved packing-ring are parallel and that the faces thereof which contact and are adapted to slide upon the corresponding faces of the opposite section are straight and parallel. In other words, the sliding faces of the sections are arranged parallel with tangents of the rod or stem which extends through the packing, and hence the adjustment of the sections to take up lost motion due to wear or irregularities in the surface of the rod or stem is accomplished by a light spring without unnecessary friction. Also, this construction provides for applying the packing-ring to the rod or stem at any point, and hence avoids slipping the sections on the rod from the end. This adapts the device to be applied with greater facility, inasmuch as the connections with the ends of the piston-rod or stem may remain in their operative positions while the packing is being restored.

It will be seen, furthermore, that the depth of the packing-rings is less than the depth of the channels in the frame, and that the inner edges of the web 10 and covering plates 18 are out of contact with the surface of the rod or stem, the inner peripheries of said web and covering plates being larger in diameter than the rod or stem, and hence the packing-rings are capable of yielding in either direction to accommodate irregularities in the surface or deflection of any portion of the rod or stem without altering the steam-tight contact of the packing with its surface.

Various other advantages of the improved packing will be obvious to those familar with the art to which the invention pertains, and it will be understood that various changes in the form, proportion and minor details of construction may be resorted to without departing from the spirit of the invention or sacrificing any of the advantages thereof.

Having described the invention, what is claimed is—

1. A self-adjusting metallic packing comprising an annular cross-sectionally T-shaped frame having a shell 7 and an inwardly extending web 10, and adjustable packing rings less in depth than and fitting in the annular channels upon opposite sides of the web of the frame and comprising opposite relatively adjustable sections or members having straight interlocking extensions arranged parallel with tangents of the rod or stem extending through the packing, the outer surfaces of said rings being flush with the lateral edges of the shell, band springs arranged exteriorly upon the packing-rings to hold the inner surfaces of the sections or members thereof in steam-tight contact with the surface of the rod or stem, and covering plates bearing against the said flush surfaces of the packing-rings and shell, the inner peripheries of the web and covering plates being of greater diameter than the rod or stem, whereby said rod or stem with the packing-rings, which are held from movement in the direction of reciprocation of the rod or stem by the web and covering plates, are capable of radial movement, substantially as specified.

2. A self-adjusting metallic packing having packing-rings comprising opposite similar relatively adjustable sections or members, each consisting of a segmental or arc-shaped body portion provided with terminal parallel arms or extensions of half thickness arranged parallel with tangents of the rod or stem extending through the packing, the arms or extensions of one of said members being provided with longitudinal ribs 16ᵃ to fit in longitudinal slots 16ᵇ in the arms or extensions of the other member, and means for holding the sections or members in operative positions and pressing them inward to cause steam-tight contact of their inner peripheries with the surface of the rod or stem, substantially as specified.

In testimony that we claim the foregoing as our own we have hereto affixed our signatures in the presence of two witnesses.

WILSON E. SYMONS.
THOMAS SMITH.

Witnesses:
WILLIAM SCHULTZ,
BEN JOHNSON.